May 30, 1939. G. H. SEITZ Re. 21,107

SHEET FILTER

Original Filed Nov. 14, 1936 2 Sheets-Sheet 1

INVENTOR.
GEORG HEINRICH SEITZ

BY Richards & Geier
ATTORNEYS

SHEET FILTER

Original Filed Nov. 14, 1936 2 Sheets-Sheet 2

INVENTOR.
GEORG HEINRICH SEITZ
BY
Richards & Geier
ATTORNEYS

Reissued May 30, 1939 Re. 21,107

UNITED STATES PATENT OFFICE 21,107

SHEET FILTER

Georg Heinrich Seitz, Bad Kreuznach, Rhineland, Germany, assignor to Seitz-Werke, G. m. b. H., Bad Kreuznach, Rhineland, Germany Original No. 2,076,049, dated April 6, 1937, Serial No. 110,801, November 14, 1936. Application for reissue July 22, 1937, Serial No. 155,147. In Germany March 22, 1932

3 Claims. (Cl. 210—188)

This invention relates to filters and relates more particularly to filter presses comprising a large number of angular frames clamping thin filter sheets situated between these frames, the liquid to be filtered being supplied to the filter sheets through a channel formed by the assembly of the filter frames and being removed from the filter sheets through another channel formed by the said assembly.

The present application is a continuation-in-part of my co-pending patent application relating to Filter presses, filed July 20, 1935, Serial Number 32,413.

An object of the present invention is the provision of a simple and efficiently operable filter, the filter sheets of which are always maintained in their proper relative positions.

The above and other objects of the present invention may be realized by providing a filter which comprises a plurality of filter frames interposed between the frames, means for clamping the assembled frames and sheets, and a support for the filter sheets, which support may be attached to the filter frames, to the main frame supporting the entire assembly or to the drip pan situated underneath the filter frames and the filter sheets. This support is used for maintaining the filter sheets in their proper positions relatively to the filter frames before the frames are pressed against each other to clamp the filter sheets.

The invention will appear more clearly from the following detailed description when taken in connection with the accompanying drawings showing, by way of example, preferred embodiments of the inventive idea.

Figure 1:
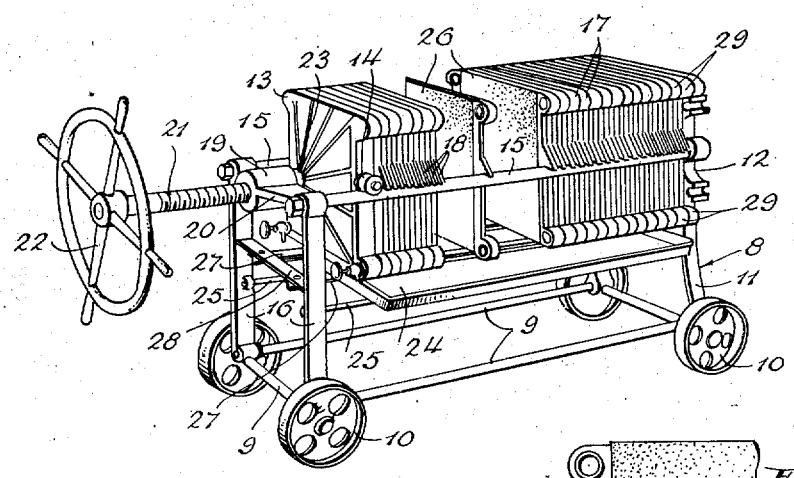
Figure 1 is a perspective view of a filter having supporting means connected to its main frame.
Figure 2:
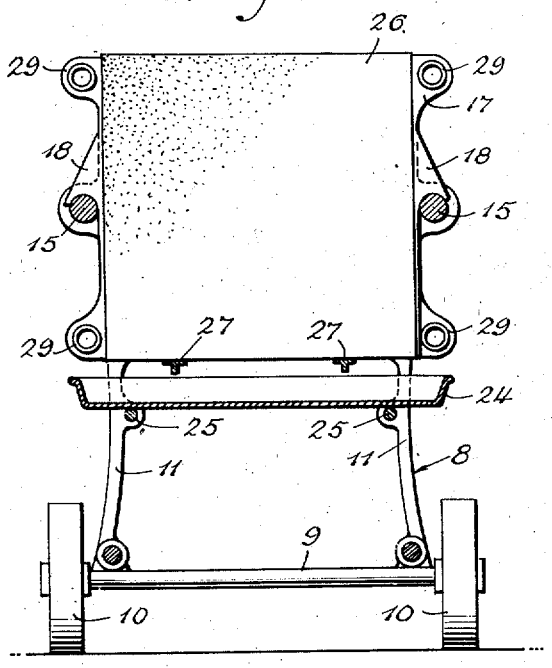
Figure 2 is a cross-section through the filter shown in Figure 1.
Figure 3:
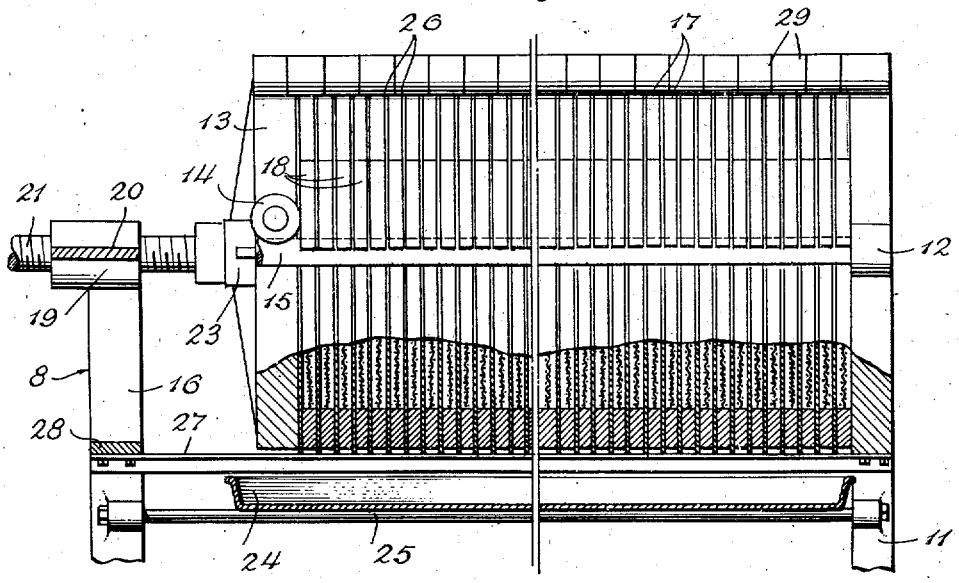
Figure 3 is a longitudinal vertical section, through the filter shown in Figure 1, and partly a side elevation.

The filter press shown in Figures 1, 2 and 3 of the drawings, comprises a main frame 8 which is provided with horizontal bars 9 preferably supported upon wheels 10. Two vertical bars 11 support an end frame 12 which is integral with the bars 11. A second end frame 13 carries rollers 14, one of which is shown in Figure 1, and is supported upon horizontal rails or bars 15 which are carried by the vertical bars 11 and 16.

The device comprises a large number of filter frames 17 which are clamped between the end frames 12 and 13 when the filter is being operated. Each filter frame 17 is provided with a pair of lateral triangular projections 18 having curved lower surfaces which fit over the surfaces of the round bars 15. Due to this arrangement the filter frames 17 are suspended upon the bars 15 and may be shifted along these bars.

The clamping means used for clamping the filter frames 17 comprise a boss 19 connected by the web 20 with the vertical supports 16. The inner surfaces of the boss 19 are theaded and mesh with the screw threads of a lead rod 21 one end of which carries a hand wheel 22. The opposite end of the lead rod 21 is rotatably held within a socket 23 constituting an integral part of the end frame 13.

A drip pan 24 is situated underneath the filter frames 17 and is carried by two bars 25 which extend between the vertical bars 11 and 16 and are firmly connected therewith.

Filter sheets 26 are interposed between the filter frames 17 and are firmly clamped between these frames when the filter is being operated. As shown in Figure 2, each filter sheet 26 consists of a thin square piece made of a filter material.

The filter sheets 26 are supported by two parallel horizontal bars 27 the adjacent ends of which are suspended from a cross-plate 28 situated between the two vertical bars 16 and firmly connected therewith. The opposite ends of the bars 27 are connected to the end frame 12. The bars 27 extend directly underneath the filter frames 17 and serve as a gauge and support for each filter sheet 26 when it is inserted between two adjacent filter frames 17, its lower edge resting upon the bars 27.

When the filter is not being used, the end frame 13 is situated at such distance from the end frame 12, that the filter frames 17 may be moved freely upon the bars 15. A separate filter sheet 26 is situated in each space between two adjacent filter frames 17 and is carried by the bars 27. In order to clamp the filter sheets 26, the operator rotates the hand wheel 22 thereby moving the end frame 13 toward the end frame 12 and pressing it against the filter frames 17. Each filter frame 17 comprises cylindrical projections 29 which fit one into the other to form passages for the turpid liquid and for the clear filtered liquid. A wire net may be situated within the interior of each filter frame. The channels communicate with the interiors of the filter frames in such manner that the turpid liquid to be filtered is supplied to the interiors of alternate frames and that the clear filtered liquid is removed from the interiors of the remaining i. e. other alternate frames. As indicated in Figure 3, the filter frames 17 are arranged in such manner that two cylindrical projections 29 of two filter frames fit over an edge of an intermediate filter frame the cylindrical projection of which is situated at the opposite side of the filter.

Due to the provision of the bars 27, each of the filter sheets 26 is maintained in its proper position relatively to the filter framese 17 at all stages of preparatory and final assembly. After the completion of the filtering operation and the withdrawal of the end frame 13, the filter sheets 26 are again supported by the bars 27 and may be scraped or cleaned while they are in that position.

Figure 4:
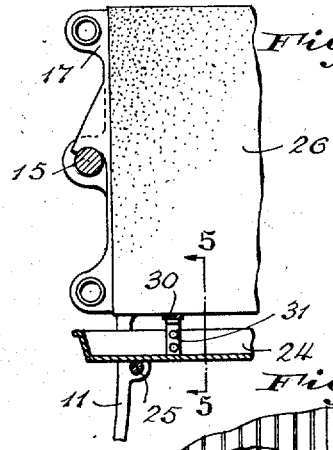
Figure 4 is a detail cross-section through a filter the supporting means of which are connected in the drip pan.
Figure 5:
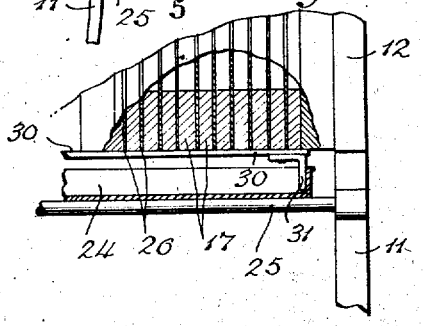
Figure 5 is a section along the line 5—5 of Figure 4, on a larger scale.

The filter shown in Figures 4 and 5 of the drawings comprises an end frame 12 carried by a vertical bar 11 and filter frames 17 carried by a bar 15 connected to the main frame of the filter. A drip pan 24 is situated underneath the filter frames 17 and is carried by a bar 25 connected to the vertical bar 11. Filter sheets 26 which are interposed between the filter frames 17 are carried by a bar or support 30 the angular end brackets 31 of which are firmly connected to the opposite side walls of the drip pan 24.

Figure 6:
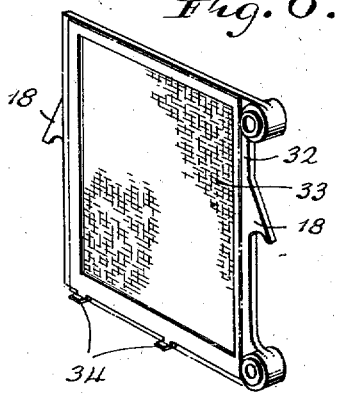
Figure 6 is a perspective view of a filter frame equipped with filter sheet supporting means.
Figure 7:
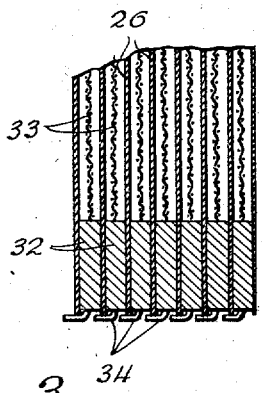
Figure 7 is a detail longitudinal section through a filter composed of filter frames shown in Figure 6.

The filter shown in Figures 6 and 7 comprises filter frames 32 carrying sheets of wiring 33 and supported by projections 18 upon the bars of the main frame. Each of the filter frames 32 carries two horizontal lugs 34 which are firmly connected or integral with the filter frame. The lugs 34 support the filter sheets 26 which are interposed between the filter frames 32.

The lugs may project beyond both of the vertical surfaces of each frame in view of the common usage of reversing the filter frames and may be located at different distances from the lateral edges of the filter frames.

While filter sheets of square contour possess definite advantages, such as the possibility of using simple supporting means and of reversing the filter sheets along with the filter frames, in addition to the saving of filter material and the provision of maximum filtering surfaces, filter sheets of polygonal contour other than square, and circular filter sheets may also be conveniently employed.

What is claimed is:

1. A filter, comprising in combination a plurality of vertical filter frames situated side by side, each filter frame comprising two projections situated on opposite sides of the frame and at least two sleeves, a plurality of self-sustaining cardboard-like filter sheets, each filter sheet being situated between two adjacent filter frames, a main frame having at least two bars extending transversely to said filter frames on opposite sides thereof, and means situated at the bottom of said filter frames and contacting the bottom edges of the filter sheets interposed between the filter frames to support said filter sheets; said projections being slidably mounted upon said bars, whereby said filter frames are carried by said bars, said sleeves being adapted to contact each other to form passages for the circulating liquid, and means for pressing the filter frames one against the other, whereby the filter sheets are clamped by the filter frames.

2. A filter, comprising in combination a plurality of filter frames situated side by side, each filter frame comprising two projections situated on opposite sides of the frame and at least two sleeves, a plurality of filter sheets, each filter sheet being situated between two adjacent filter frames, a main frame having at least two bars extending transversley to said filter frames on opposite sides thereof, and a rod extending directly underneath and transversely to said filter frames, said rod supporting the filter sheets interposed between the filter frames; said projections being slidably mounted upon said bars, whereby said filter frames are carried by said bars, said sleeves being adapted to contact each other to form passages for the circulating liquid, and means for pressing the filter frames one against the other, whereby the filter sheets are clamped by the filter frames.

3. A filter, comprising in combination a plurality of filter frames situated side by side, each filter frame comprising two projections situated on opposite sides of the frame and at least two sleeves, a plurality of filter sheets, each filter sheet being situated between two adjacent filter frames, a main frame having at least two bars extending transversely to said filter frames on opposite sides and a support extending underneath said filter frames and carrying said filter sheets; said projections being slidably mounted upon said bars, whereby said filter frames are carried by said bars, said sleeves being adapted to contact each other to form passages for the circulating liquid, and means for pressing the filter frames one against the other, whereby the filter sheets are clamped by the filter frames.

GEORG HCH. SEITZ.